(12) United States Patent
Bacchiani et al.

(10) Patent No.: US 8,069,043 B2
(45) Date of Patent: *Nov. 29, 2011

(54) SYSTEM AND METHOD FOR USING META-DATA DEPENDENT LANGUAGE MODELING FOR AUTOMATIC SPEECH RECOGNITION

(75) Inventors: Michiel A. U. Bacchiani, Summit, NJ (US); Brian E. Roark, Morristown, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/793,181

(22) Filed: Jun. 3, 2010

(65) Prior Publication Data

US 2010/0241430 A1 Sep. 23, 2010

Related U.S. Application Data

(63) Continuation of application No. 10/976,378, filed on Oct. 29, 2004, now Pat. No. 7,752,046.

(60) Provisional application No. 60/515,781, filed on Oct. 30, 2003.

(51) Int. Cl.
*G10L 15/06* (2006.01)

(52) U.S. Cl. ........................................ 704/245

(58) Field of Classification Search .................... 704/245
See application file for complete search history.

(56) References Cited

U.S. PATENT DOCUMENTS

| | | | |
|---|---|---|---|
| 6,415,248 B1 | 7/2002 | Bangalore et al. | |
| 2002/0087315 A1 | 7/2002 | Lee et al. | |
| 2002/0103789 A1 | 8/2002 | Turnbull et al. | |
| 2002/0123891 A1 | 9/2002 | Epstein | |
| 2003/0191627 A1 | 10/2003 | Au | |
| 2003/0191639 A1 | 10/2003 | Mazza | |
| 2004/0044516 A1 | 3/2004 | Kennewick et al. | |
| 2004/0098265 A1 | 5/2004 | Kelly et al. | |
| 2004/0199484 A1 | 10/2004 | Smith et al. | |
| 2005/0043957 A1 | 2/2005 | Lin | |
| 2005/0283782 A1 | 12/2005 | Lu et al. | |
| 2006/0236368 A1 | 10/2006 | Raja et al. | |
| 2006/0293921 A1 | 12/2006 | McCarthy et al. | |
| 2008/0215329 A1 | 9/2008 | Dharanipragada et al. | |

OTHER PUBLICATIONS

Bacchiani et al., "Meta-Data Conditional Language Modeling", Acoustics, Speech, and Signal Processing, 2004, Proceedings (ICASSP '04), IEEE International Conference on Montreal, Quebec, Canada May 17-21, 2004, Piscataway, NJ, USA, IEEE, vol. 1, May 17, 2004, pp. 241-244.

*Primary Examiner* — Jakieda Jackson

(57) ABSTRACT

Disclosed are systems and methods for providing a spoken dialog system using meta-data to build language models to improve speech processing. Meta-data is generally defined as data outside received speech; for example, meta-data may be a customer profile having a name, address and purchase history of a caller to a spoken dialog system. The method comprises building tree clusters from meta-data and estimating a language model using the built tree clusters. The language model may be used by various modules in the spoken dialog system, such as the automatic speech recognition module and/or the dialog management module. Building the tree clusters from the meta-data may involve generating projections from the meta-data and further may comprise computing counts as a result of unigram tree clustering and then building both unigram trees and higher-order trees from the meta-data as well as computing node distances within the built trees that are used for estimating the language model.

20 Claims, 2 Drawing Sheets

SYSTEM AND METHOD FOR USING META-DATA DEPENDENT LANGUAGE MODELING FOR AUTOMATIC SPEECH RECOGNITION

PRIORITY CLAIM/RELATED APPLICATION

The present application is a continuation of U.S. patent application Ser. No. 10/976,378, filed Oct. 29, 2004, which is a non-provisional application of U.S. Provisional Application No. 60/515,781 filed on Oct. 30, 2003, the contents of which are incorporated herein by reference. The present application is related to U.S. patent application Ser. No. 10/977,030, filed on Oct. 29, 2004, the content of which is incorporated herein by reference.

BACKGROUND OF THE INVENTION

1. Field of the Invention

The present invention relates to speech recognition and more specification to using meta-data dependent language modeling for speech recognition.

2. Introduction

Speech recognition has gained momentum as a viable technology over time. As computer processors improve and as the language models and recognition algorithms improve, the recognition accuracy for systems that perform speech recognition also improve. One way used by those of skill in the art to improve automatic speech recognition (ASR) is to use language models that have many recognition examples and samples within a certain "domain." For example, if a speech recognition engine is to recognize speech from a person who will be talking about making a flight reservation, then there is a known world of words and phrases that are expected to be spoken by the user. The speech recognition engine and the experts designing the system can make use of commonly used words for that domain to improve recognition.

A language model used by a speech recognition engine needs to be "trained" to recognize speech. This typically involves experts recording average or expected discussions between a person and the system, labeling that data, and creating the language model. For example, the expert may record a person saying "I want to fly from LA to New York". The person would then label the terms used "LA", "New York" and so forth so that the system, when faced with similar sounding words in live use, will associate the appropriate sound with the appropriate word. With enough training data that covers many scenarios, the language model is ready for live use to listen to real users.

There are still many challenges with providing a speech recognition application that approaches acceptable recognition accuracy such that its use will become widespread. While many technologies exist to help improve accuracy, there is a need in the art to consider extending the information used by a recognition engine beyond what is presently available to further improve the technology.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

The present invention provides for systems, methods and computer-readable media for using meta-data to condition language modeling in spoken dialog systems or any other application for speech recognition. Disclosed are systems and methods for providing a spoken dialog system using meta-data to build language models to improve speech processing. Meta-data is generally defined as data outside received speech; for example, meta-data may be a customer profile having a name, address and purchase history of a caller to a spoken dialog system.

The method embodiment of the invention comprises building tree clusters from meta-data and estimating a language model using the built tree clusters. The language model may be used by various modules in the spoken dialog system, such as the automatic speech recognition module and/or the dialog management module. Building the tree clusters from the meta-data may involve generating projections from the meta-data and further may comprise computing counts from the meta-data and building both unigram trees and higher-order trees from the meta-data as well as computing node distances within the built trees that are used for estimating the language model.

Building the unigram tree and higher-order trees and generating projections from the meta-data provide a process where meta-data containing many parameters may be used for estimating language models for automatic speech recognition.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Figure 1:
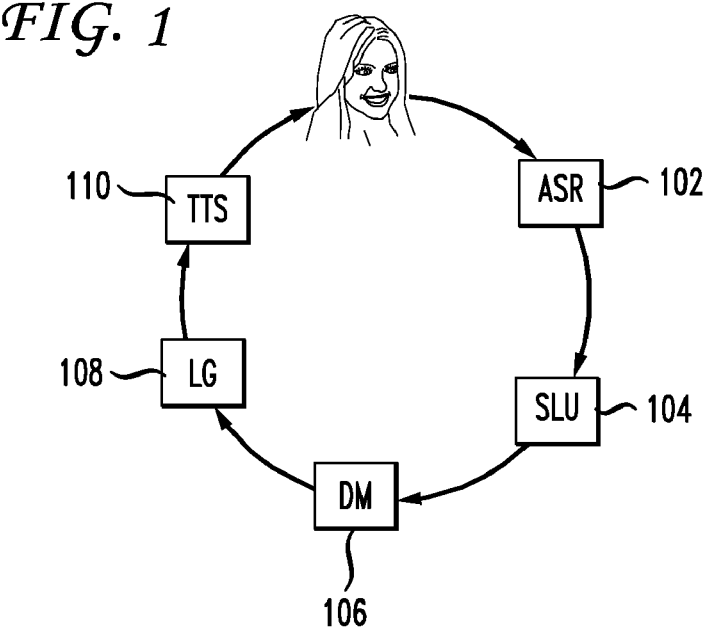
FIG. 1 illustrates the modules used in a spoken dialog system.

Throughout this description, there terms ASR and speech recognition engine will be used. An ASR module or speech recognition engine typically is a component in a larger spoken dialog system that includes, as is shown in FIG. 1, an ASR module 102, a spoken language understanding (SLU) module 104, a dialog manager 106, a language generation module 108 and a text-to-speech module 110. These modules will recognize the user's speech utterances, identify (or understand) the meaning of the text, determine an appropriate response in the spoken dialog, generate the text of the appropriate response and from that text, generate the audible "speech" from the spoken dialog system that the user then hears. In this manner, the user can carry on a natural language dialog with the system. Those of skill in the art will understand the programming languages and means for generating and training the ASR module 102 or any of the other modules in the spoken dialog system. Further, these modules may operate independent of a full dialog system. For example, a computing device such as a smartphone (or any computing device having a phone or communication capability such as VoIP) may have an ASR module wherein the user may say "call mom" and the smartphone acts on the instruction without a "spoken dialog." Similarly, each of these components may use a language model generated by the method disclosed herein and have independent application depending on the computing device with which they are associated.

Those of skill in the art know of the various approaches and technologies that may be employed to deploy such a dialog system. This invention has application to many if not all of these modules in the dialog system. The invention will mainly be described with reference to the ASR module but the basic principles are also applicable to improved text-to-speech, dialog management, or any of the processes in any module associated with speech recognition. Furthermore, the principles of the invention may be applied to any use of ASR beyond any specific spoken dialog system.

As introduced above, speech recognition is improved by focusing the language models on words and phrases within a known domain. In addition to knowing or expecting that certain words may be spoken, those designing speech recognition engines may also use other information to help modify and adjust speech recognition algorithms to improve accuracy. For example, if the engine knows that the speaker is a man or woman, or if the engine knows that the user is a teenager, for example. This kind of information can assist the engine in making appropriate assumptions about speech patterns, dialect, and so forth that aid in improving the recognition accuracy.

For many ASR applications, information in addition to the speech that is to be recognized is available. For example, a company receiving speech from a customer might have a database of information and customer profile information associated with that customer. This additional information may be referred to as meta-data. Although this meta-data contains information useful for the recognition task (for example geographical location, previous purchases and product preferences) it cannot be used directly in the language model as the information is too fragmented providing little training data for each unique customer profile.

ASR can occur where meta-data is available, such as when access to a customer database record is available during a call. Conditioning the ASR models directly on this information to improve the transcription accuracy is hampered because, generally, the meta-data takes on many values and a training corpus will have little data for each meta-data condition. For example, taking the flight reservation example above, using a person's name and address that would be found in their record database may not assist much in recognizing natural language speech during a dialog.

The present invention, however, presents a system and method of constructing language models conditioned on such meta-data. The method preferably uses tree-based clustering of the training data to automatically derive meta-data projections, useful as language model conditioning contexts. The method has been tested on a multiple domain voicemail transcription task. The performance of an adapted system aware of the domain shift has been compared to a system that only has meta-data to infer that fact. The meta-data that may be used include the callerID strings associated with the voicemail messages. The meta-data adapted system matched the performance of the system adapted using the domain knowledge explicitly.

Adaptation of ASR models to the operating environment and context has been shown repeatedly to be of enormous benefit. This is particularly true of acoustic models, where many robustness issues that arise when dealing with variations in channel and speaker characteristics have been successfully addressed by use of unsupervised self-adaptation and normalization techniques. Adaptation has also been shown to be effective for language modeling. In light of the popularity of the Maximum Entropy (ME) algorithm, some language model adaptation efforts have looked at using long distance history features, such as triggers or lexico-syntactic features, and external features such as topic. Most of the adaptation efforts have focused on adapting on the test data itself (unsupervised self-adaptation) or on a sample representative of the context of interest.

Some ASR systems use contextual information, associated with but external to the speech signal such as gender or topic to shape the model distributions. This external information can be either explicitly given or inferred implicitly from the speech signal. For example, a gender dependent system might use the test data likelihood as modeled by gender dependent models to infer the speaker gender. Information external to the speech signal will be referred to herein, regardless of whether it was given or inferred, as meta-data.

Many applications have a large amount of meta-data available, e.g. from databases associated with the speech to be recognized. For example, a company receiving a call from a customer might have access to a database record of that customer, revealing their geographical location, product preferences, purchasing history, address, web-surfing history, and so forth. Until the introduction of the present invention, the models used in ASR systems have not used this type of information.

If the meta-data is sparse in the sense that it can take on few values, meta-data dependent models can be trained directly. An example of a "sparse" meta-data record may be one that includes only gender information, i.e., either male or female. Another approach is to adapt a meta-data independent model using the data corresponding to a specific meta-data value. For example, one approach of using sparse gender meta-data is to build a separate model on the gender-dependent data sets (or data sets based on any type of data within the meta-data). Another approach is to adapt a gender (or other type of data) independent model built on all data towards the gender of interest by using the gender dependent data. For example, increase the weight of the female data compared to the male data to obtain a model that is skewed towards female speech but still benefits from the larger data pool that does include male data. This weighing or skewing of the type of data within the meta-data can therefore provide improvement in speech recognition.

In many scenarios the meta-data space will be large, i.e. it can take on many values (for example, name, gender, address, language, dialect, age, etc). As a result, there will be little data available for a specific meta-data value, making direct conditioning infeasible. However, if the highly fragmented meta-data can be projected to a small number of conditioning contexts, it may be used to condition the ASR models. Take the gender example: it might not be possible to create speaker-identity dependent models but if a projection can be found that provides clusters representing gender, conditioning on the speaker identity will be beneficial.

The present invention is especially useful to construct meta-data conditional language models suitable for highly fragmented meta-data. The invention may be embodied as a spoken dialog system, a spoken dialog module such as an ASR module, a spoken dialog module training process, a method for generating a conditional language model and/or a computer-readable medium. In one aspect of the invention, the method uses divisive likelihood-based clustering techniques to find projections of the meta-data, which is a good choice in the face of such fragmentation. A meta-data conditional model is then obtained by merging the meta-data conditional counts, weighted based on the given meta-data value. Experimental results for a voicemail transcription task show promise for this approach.

Figure 2:
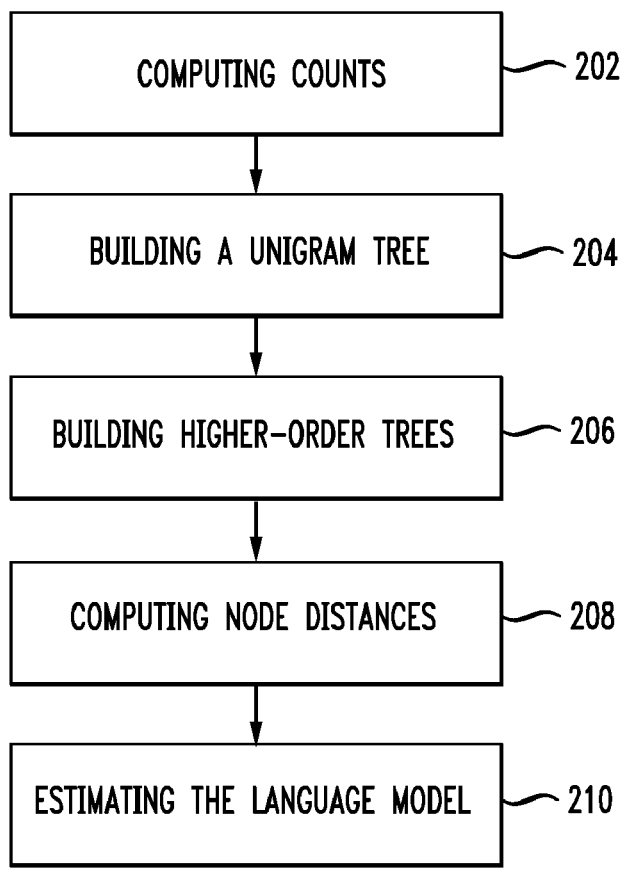
FIG. 2 illustrates a method embodiment of the invention.

The language model estimation algorithm comprises preferably two parts. FIG. 2 illustrates generally the steps for generating a language model using a tree clustering approach. The first part is a tree clustering step which may be performed at training time. The clustering result produced by the first step is then preferably used at test time to estimate the language model used in recognition or in another spoken dialog module. Both steps are described in detail below.

The first part of the process relates to identifying projections based on the meta-data. An example identification method is tree clustering which is more fully explained next. For an n-gram model of order k, the tree-clustering step involves estimating models for each order $\leq k$ beginning with the unigram model. The method used for the unigram tree is different from this higher order trees, and will be presented first. First, a process of computing counts (202) is performed followed by a process of building a unigram tree (204). The output of the unigram clustering is used for building the higher-order trees (206), which are built in two steps to control the greediness of the algorithm, allowing different meta-data dependencies for different histories.

The tree clustering algorithm groups history and meta-data dependent n-gram count distributions. As used herein, "h" is a history of words. For example, for the word sequence "flight to LA", the words "flight to" are an observed history for the word "LA" as it was seen preceding that word. Counting not just the frequency of words "w" but the frequency of "w" in different histories "h" fragments the counts. For the example, the system may see LA in various histories "flight to LA", "moving to LA", "is from LA" etc. The meta-data label x indicates different meta-data conditions. For example, x could be first name, gender and age. Making counts not only of history but also of meta-data dependent further fragments the counts. In another example, assume that one now has different counts for "flight to LA" as spoken by Mary, female, age 33 and for "flight to LA" as spoken by Rob, male, age 22. Clearly the number of unique context dependent counts C(w|h, x) becomes very large and as a result frequencies become poor estimators due to data sparsity.

For a given vocabulary V let w∈V denote words, and h∈$V^k$ denote a history, or conditioning sequence of k words. As mentioned above, x represents the set of possible meta-data values such as name, gender, language spoken, age, etc. Let C(w|h, x) denote the raw count distribution across words w∈V following history h∈V*, in meta-data condition x∈V. Then, $$C(w \mid h) = \sum_{x \in X} C(w \mid h, x).$$

The clustering algorithm preferably uses a likelihood objective. Likelihoods are computed based on smoothed probability distribution estimates to account for unobserved events. The smoothing technique preferably uses Good-Turing discounting and Katz backoff estimation to provide probability estimates from counts, in the standard way. See, I. Good, "The population frequencies of species and the estimation of population parameters," *Biometrica V, vol.* 40, no. 3, 4, pp. 237-264, 1953; and S. Katz, "Estimation of probabilities from sparse data fro the language model component of a speech recognizer," *IEEE Transactions on Acoustic, Speech, and Signal Processing*, vol. 35, no. 3, pp. 400-401, 1987, incorporated herein by reference. It is understood that other approaches for clustering and smoothing may also be used. Let d(f) denote the discounting fraction for frequency f, such that $0 < d(f) \leq 1$, where d(f) is calculated once using, for example, Katz backoff estimation on the sample of meta-data independent counts. For frequencies 6 and higher, d(f) may equal 1.

The meta-data dependent count distributions are clustered by building trees in increasing Markov order, starting with unigrams. The results of the unigram tree clustering (the calculated counts) are used both for subsequent unigram probability estimation as well as for building the higher order trees.

Since for the unigram count distributions h∈$V^0$ (i.e. there is no word history), the count distributions used in building this tree are C(w|x) for all x∈X. The tree is built by greedily splitting the leaf that provides the largest likelihood gain. Leaf splits are evaluated using, for example, the Chou algorithm which will be described here briefly. The evaluation of the merit of a split is an iterative process. See, P. Chou, "Optimal partitioning for classification and regression trees," *IEEE Transactions on Pattern Analysis and Machine Intelligence*, vol. 13, no. 4, pp. 340-354, 1991, incorporated herein by reference. Let A⊂X denote the set of meta-data values that are assigned to the leaf, the split gain is evaluated as follows:

1. Estimate a parent probability distribution $$C(w \mid A) = \sum_{x \in A} C(w \mid x) \tag{1}$$

$$C(A) = \sum_{x \in V} C(w \mid A) \tag{2}$$

$$P(w \mid A) = \begin{cases} \dfrac{d(C(w \mid A))C(w \mid A)}{C(A)} & \text{if } C(w \mid A) > 0 \\ \delta & \text{otherwise} \end{cases} \tag{3}$$

choosing δ to ensure proper normalization and estimate the parent data log likelihood $$L_P = \sum_{w \in V} C(w \mid A) \log(P(w \mid A)) \tag{4}$$

set $m = 1$.

2. Randomly partition set A into two disjoint subsets L0 and R0, i.e. $A = L_0 \cup R_0$ and $L_0 \cap R_0 = \emptyset$.

3. For Q in $\{L_{m-1}, R_{m-1}\}$ compute, $$C(w \mid Q) = \sum_{x \in Q} C(w \mid x) \tag{5}$$

$$C(Q) = \sum_{w \in V} C(w \mid Q) \tag{6}$$

$$P(w \mid Q) = \begin{cases} \dfrac{d(C(w \mid Q))C(w \mid Q)}{C(Q)} & \text{if } C(w \mid Q) > 0 \\ \alpha P(w \mid A) & \text{otherwise} \end{cases} \quad (7)$$

where $\alpha$ is chosen to ensure a normalized distribution.

4. Set $L_m = R_m = \emptyset$. For each member $x \in A$, evaluate $$L_l(x) = \sum_{w \in V} C(w \mid x) \log(P(w \mid L_{m-1})) \quad (8)$$

$$L_r(x) = \sum_{w \in V} C(w \mid x) \log(P(w \mid R_{m-1})) \quad (9)$$

and
assign x to $L_m$, if $L_l(x) > L_r(x)$, to $R_m$ otherwise.

5. Compute total likelihood $$L(A) = \sum_{x \in L_m} L_l(x) + \sum_{x \in R_m} L_r(x). \quad (10)$$

If m>1 and L(A)=B go to 7.

6. Set m=m+1. Set B=L(A). Go to 3.

7. Set $G = B - L_p$. Set $L = L_m$, $R = R_m$.

After termination of this iterative process, a partition of A into two subsets L and R is defined providing a likelihood gain G associated with that partition.

The unigram tree is built by iteratively splitting the leaf with the largest likelihood gain and evaluating the likelihood gain of the new leaves created by those splits. Once the likelihood gain of the best leaf split falls below a given threshold $T_{unigram}$, the unigram tree building step terminates. The unigram tree will then define N leaf sets, grouping the observed meta-data contexts X. The sets defined in this N-way partition will be denoted as $S = \{s_1, s_2, \ldots, s_N\}$.

Like the unigram tree, the higher order ($h \in V^k$, k>0) trees define a partition of the history and meta-data dependent n-gram count distributions. The count distributions used in building these trees are $C(w \mid h, x)$ for all $x \in X$ and $h \in V^{n-1}$. The higher order trees, like the unigram tree, are built by greedily splitting the leaf that provides the largest likelihood gain. Unlike the unigram tree, the higher order trees are built in two stages.

In the first stage, the count distributions are partitioned allowing only history dependent splits. In other words, only subsets of $V_{n-1}$ are considered, no subsets of X are allowed. As a result, all meta-data dependent occurrences of a history h are forced to fall in the same leaf. This clustering stage again uses the Chou algorithm for the evaluation of the likelihood gains from splitting leaves. Once this algorithm terminates based on a given likelihood gain threshold $T_{history}$, the leaves of the tree will contain groups of histories. These leaves or nodes are referred to as the history nodes of the tree.

In the second stage, the leaves are split further but now only via domain splits. In other words, only partitions of X are allowed at this stage. The gain from splitting leaves is evaluated similarly to the Chou algorithm, however instead of repartitioning based on likelihood (step 4 of the Chou algorithm), only partitions based on class memberships are considered. The classes that are considered are those defined by the unigram tree leaves, i.e. S. The gains for partitioning on each class in S are computed and the partition that results in the largest likelihood increase is used if that leaf is split.

Again, a given likelihood threshold $T_{ngram}$ determines when the tree growing algorithm terminates.

After termination of the tree growing algorithm, each history $h \in V^{n-1}$ is assigned to one or more leaf nodes. The number of leaf nodes the history appears in determines the number of distinct meta-data projections for that history.

The final step in the tree clustering stage of the algorithm is a distance computation (208). Let J denote the set of nodes containing the root node of the unigram tree and the history nodes of the higher order trees. For each node $k \in J$, let $U_k$ denote the set of leaves that are descendants of k. Then for each $k \in J$:

1. For each node $m \in U_k$ compute $P(w \mid m)$ as in step 1 of the Chou algorithm, i.e. estimate the leaf conditional distribution based on the subset of histories and meta-data values that were assigned to that leaf.

2. For each node $m \in U_k$ compute a distance $D(m, p)$ to all $p \in U_k$. The distance is defined as the Kullback-Liebler distance $$D(m, p) = \sum_{w \in V} P(w \mid m) \log\left(\frac{P(w \mid m)}{P(w \mid p)}\right) \quad (11)$$

The language model estimation step is performed preferably at test time using the trees designed in the training phase. It assumes a meta-data condition v is given for the test data that is to be recognized.

Finally, using the data obtained above, the language model is estimated (210). The language model is constructed by estimating history dependent distributions for all histories h seen in the training data. Together with the meta-data value $v \in X$, each history h identifies a leaf node $m \in U_k$, for some $k \in J$. The set of nodes $p \in U_k$ define the various meta-data projections for history h. Given the meta-data value v, m is identified as the projection applicable to the current test data. Estimating a language model on the subset of the training data represented by m will likely produce a less accurate model due to sparse data resulting from the reduction of the training set size. To prevent this, all data from all meta-data projections $p \in U_k$ are used, but weighted based on the distance from m to p, i.e. $D(m, p)$.

The history dependent distribution is estimated in a two step process.

1. Estimate the discounting factors for the observed words w based on the unweighted, summed counts $$C(w) = \sum_{q \in U_k} C(w \mid q) \quad (12)$$

$$z(w) = d(C(w)) \quad (13)$$

2. Estimate the history dependent distribution based on weighted, discounted counts $$P(w \mid h) = \begin{cases} \dfrac{\sum_{q \in U_k} \tau_q z(w) C(w \mid q)}{\sum_{q \in U_k} \sum_{w \in V} \tau_q C(w \mid q)} & \text{if } C(w) > 0 \\ \gamma P(w \mid h') & \text{otherwise} \end{cases} \quad (14)$$

where h' is the history h without its initial word. The value of $\gamma$ is chosen to ensure proper normalization.

The count scales τq are derived from the distances D(m, p) as $$\tau q = \begin{cases} \dfrac{1}{D(m, q)} & \text{if } \dfrac{1}{D(m, q)} \leq \Phi \\ \Phi & \text{otherwise} \end{cases} \quad (15)$$

where Φ is a parameter of the algorithm. One can interpret this parameter as setting the maximum distance for a sibling node to be considered "in-domain", and hence receive the same weight as the node m itself. If Φ=5, then another node must be within KL-distance 0.2 to be considered in-domain.

The invention was evaluated in a controlled experiment. For this experiment, a scenario was set up using two corpora. The ScanMail corpus is a general voicemail corpus. For more information on the ScanMail application, see M. Bacchiani, "Automatic transcription of voicemail at AT&T," in *Proceedings of the International Conference on Acoustics, Speech, and Signal Processing (ICASSP)*, 2001, incorporated herein by reference. The SSNIFR corpus (the messages from the target domain) consists of voicemail message received at a network center customer care voicemail box. Although both corpora consist of voicemail messages, the language differs significantly. Adaptation of a language model built on Scan-Mail messages to the SSNIFR domain provides as much as a 7% accuracy improvement.

The experiment is controlled in the sense that an accuracy improvement can be obtained if it is known that the SSNIFR corpus differs in distributional characteristics to the ScanMail corpus. The question is how much of this accuracy improvement can be obtained if the data partition is not known and only a highly fragmented meta-data variable related to that partition is given. The meta-data used in this experiment are callerID strings provided by the telephone switch for every incoming message. For a subset of both corpora, this callerID information is available. Using these subsets training and test sets were constructed for both the ScanMail and SSNIFR domains using random partitions. Statistics for these sets are given in table 1. Out of the 169 CallerID strings associated with the ScanMail test messages, 136 were seen in the training set. Out of the 120 CallerID strings associated with the SSNIFR test messages, 78 were seen in the training set. There were no CallerID strings overlapping between the ScanMail and SSNIFR corpora.

TABLE 1

Corpus statistics

| Corpus Name | Set Type | Message Count | Unique CallerID Strings | Word Count | Speech Duration (minutes) |
|---|---|---|---|---|---|
| ScanMail | Train | 6489 | 2072 | 803838 | 4302 |
| ScanMail | Test | 169 | 149 | 21736 | 114 |
| SSNIFR | Train | 300 | 183 | 33386 | 195 |
| SSNIFR | Test | 120 | 95 | 13164 | 79 |

For the experiments, three conventional Katz backoff trigram models were trained on different data sets. The model trained on the SSNIFR training set will be referred to as SSNIFR, the one trained on the ScanMail training set will be referred to as SM. The model referred to as MRG was obtained by estimation on the combined SSNIFR and SM training sets. The fourth model, referred to as MAP was obtained using the weighted count merging approach. The weight parameter was set to 5 which was empirically determined to be the optimal value. The results obtained using these models give the performance bounds using the domain information assuming this is known.

Two meta-data dependent models were trained using the proposed algorithm on the combined SSNIFR and ScanMail training sets. As meta-data the callerID strings were used, hence the size of the set X was 2255 corresponding to the number of unique callerID strings seen in the combined corpora. Both meta-data dependent models used the same threshold values $T_{history}=1000$ and $T_{ngram}=0$ and used the same scaling parameter Φ=5. The likelihood threshold $T_{unigram}$, however, was set to 1500 for the model referred to as SpkrS and 1000 for the model referred to as SpkrL. These models represent the scenario where the domain shift is not known but a highly fragmented meta-data variable is available possibly revealing that fact.

At test time, the meta-data dependent language models were created on a per message basis, using the callerID strings associated with the test messages. If a callerID string was not seen in the training data, the system would default to the MRG model. In the absence of any knowledge about the heterogeneity of the corpus, this would be the most appropriate model.

Figure 3:
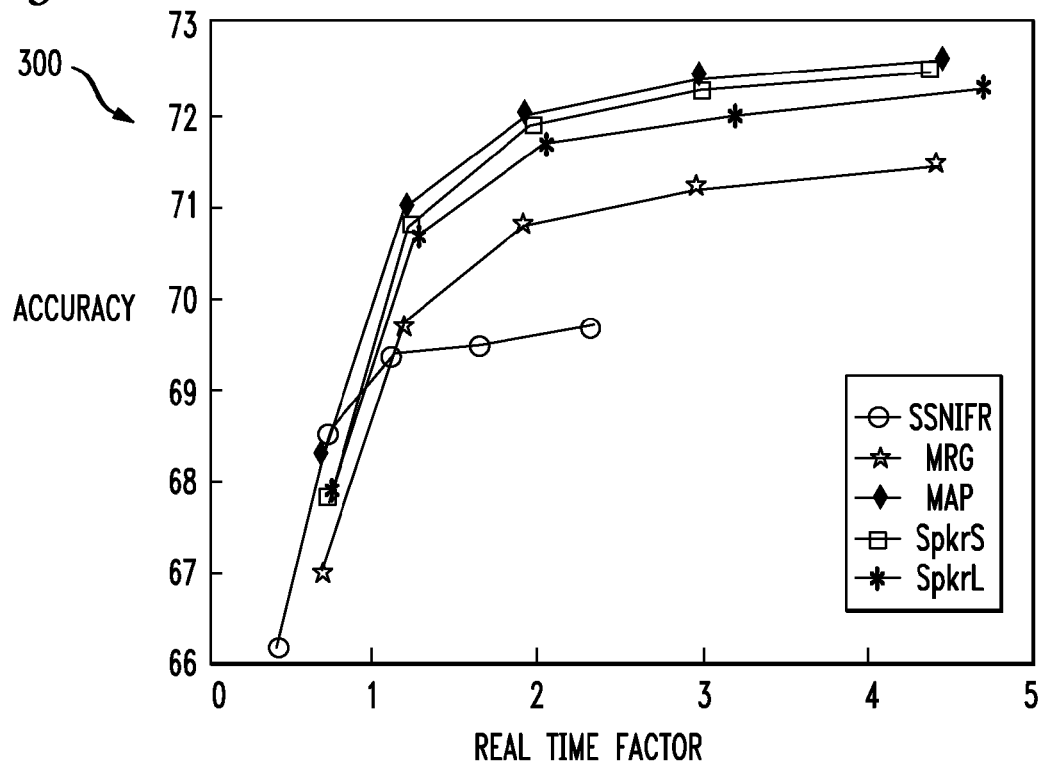
FIG. 3 illustrates recognition performance on the SSNIFR test set of data.
Figure 4:
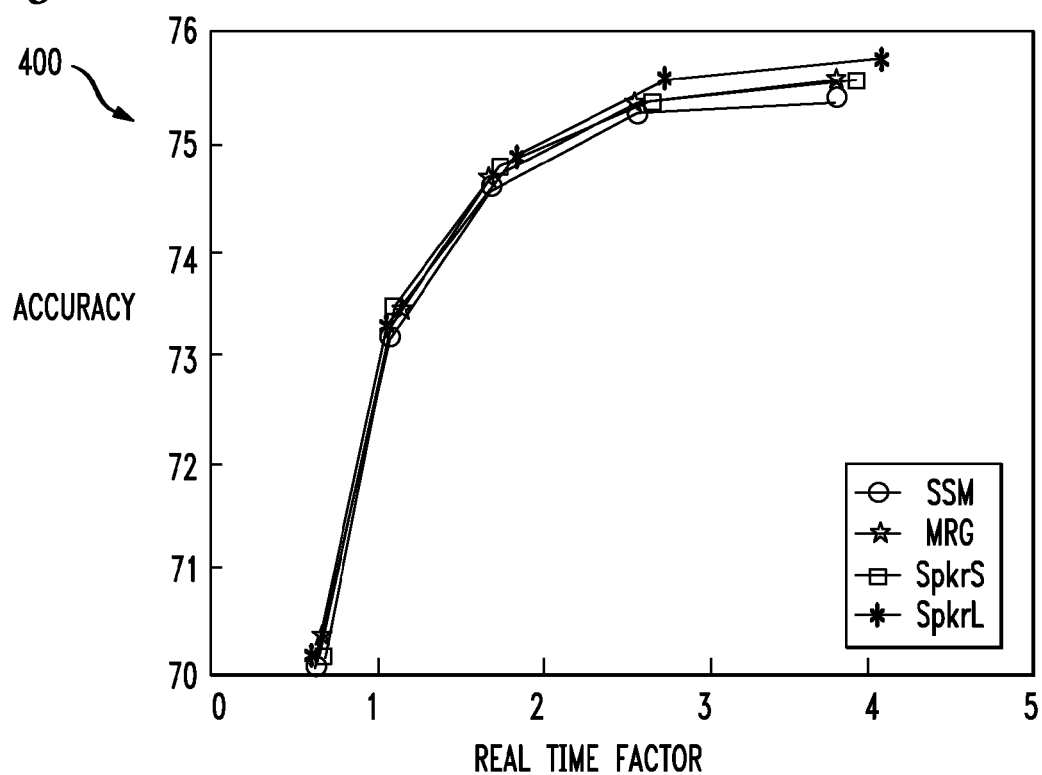
FIG. 4 illustrates recognition performance on the ScanMail test set.

The run-time vs. accuracy curves showing the performance of all the models on the SSNIFR test set are shown as graph 300 in FIG. 3. The performance of the SM, MRG, SpkrS and SpkrL models on the ScanMail test set are shown as graph 4 in FIG. 4. It can be seen that on the SSNIFR test data, the MAP model gives an additional gain over the MRG model. Both models outperform the SSNIFR model, as reported in 8. It also shows that the SpkrS model matches the MAP model performance. The SpkrL model does not perform as well as the SpkrS model but still provides a performance gain over the MRG model.

On the ScanMail test data, both the SM and MRG model give equal performance. The SpkrS and SpkrL models perform as well or show a small improvement over the baseline models.

The experimental results show that the algorithm succeeds in finding meta-data projections useful for conditioning the language model. When provided only with very fragmented meta-data and no explicit knowledge about a domain shift for a small subset of the data, the algorithm successfully created a model that matched the performance of a model adapted using the domain shift knowledge.

The weight estimation based on the inverse Kullback-Liebler distance computation appears to provide a reasonable estimate of the proximity of different meta-data projections. This is shown by the small performance difference between SpkrS and SpkrL. In the SpkrS model, 182 out of the 183 SSNIFR CallerID strings were in a single leaf of the unigram tree, along with some ScanMail messages. This means the model effectively found the SSNIFR subset from the rest of the data. In the SpkrL model, due to the lower $T_{unigram}$ parameter, that leaf was split further into 3 subsets. The resulting model performed almost as well since the distance between these subsets was found to be small and hence the SSNIFR data was weighted approximately equally even though it was partitioned into multiple subsets.

The fact that the meta-data dependency did also provide a small accuracy improvement on the ScanMail data, where little or no gain from meta-data conditioning was expected reinforces the view that the distance is appropriate.

That the SpkrS model matches the MAP performance shows that the algorithm is using the leaf distances to appropriately weight the contributions of various meta-data projections. Note that only 78 out of the 120 test messages used a meta-dependent model as the other messages defaulted to the MRG model due to a novel CallerID string.

Various aspects of the algorithm can possibly benefit from further investigation. First, the set definitions inferred from the unigram tree might not be the optimal choice for use in the higher order trees. Second, other distance and weight relationships can be considered that might give better performance. Besides algorithmic improvements, one can envision many empirical trials testing the conditioning benefit of various meta-data sources.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, meta-data may be clustered using any other algorithm or other objectives. Further, a meta-data dependent language model may be constructed using other adaptation approaches then those outlined above. Also, while FIG. 1 illustrates a spoken dialog system, there are many applications that may use an ASR module, such as appliances or computing devices that have an ASR module to listen for audible input to take an action but do not engage in a dialog with the speaker. Accordingly, the appended claims and their legal equivalents should only define the invention, rather than any specific examples given.

We claim:

1. A method of generating a language model using non-speech metadata, the method comprising:
    applying a tree growing algorithm to highly fragmented non-speech metadata associated with a caller to a spoken dialog system, wherein the highly fragmented non-speech metadata does not describe physical characteristics of the caller;
    identifying projections based on the highly fragmented non-speech metadata and leaf nodes in which a history appears as a result of applying the tree growing algorithm to yield identified projections; and
    estimating, via a processor of a computing device, a conditional, metadata dependent language model based on the identified projections and speech data from the caller.

2. The method of claim 1, wherein identifying projections further comprises using divisive likelihood-based techniques to identify non-speech metadata projections.

3. The method of claim 2, wherein identifying projections further comprises using tree-based clustering to identify the non-speech metadata projections.

4. The method of claim 1, wherein the estimated conditional, metadata dependent language model is estimated by merging non-speech metadata conditional counts that are weighted based on a given non-speech metadata value.

5. The method of claim 1, wherein identifying the projections is performed at training time.

6. The method of claim 5, wherein generating the estimated conditional metadata dependent language model is performed at test time.

7. The method of claim 1, wherein identifying the projections further comprises estimating a unigram model to generate a unigram clustering output.

8. The method of claim 7, further comprising building a higher order tree from the unigram clustering output.

9. The method of claim 8, wherein building the higher order tree further comprises:
    generating history nodes for the higher order tree; and
    splitting leaves on the higher order tree via domain splits.

10. The method of claim 9, wherein generating history nodes further comprises:
    partitioning count distributions allowing only history dependent splits; and
    terminating the splitting based on a threshold.

11. The method of claim 8, further comprising computing a distance between a root node of a unigram tree and at least one history node of a higher order tree.

12. The method of claim 11, wherein generating the estimated conditional, metadata dependent language model further comprises weighing the identified projections using the distance.

13. The method of claim 7, wherein estimating the unigram model further comprises:
    generating a unigram tree by splitting a leaf with a largest likelihood gain; and
    evaluating a likelihood gain of new leaf created by the splits.

14. The method of claim 13, wherein splitting the leaf with the largest likelihood gain is iterative.

15. The method of claim 14, further comprising terminating the iterative splitting process if one the likelihood gain of a best leaf split falls below a threshold, wherein the unigram tree defines N leaf sets.

16. The method of claim 1, wherein generating the estimated conditional, metadata dependent language model further comprises estimating history dependent distributions for histories in training data.

17. A method of performing automatic speech recognition, the method comprising:
   receiving speech;
   performing automatic speech recognition on the speech using a language model generated by steps comprising:
      applying a tree growing algorithm to highly fragmented non-speech metadata associated with a caller to a spoken dialog system, wherein the highly fragmented non-speech metadata does not describe physical characteristics of the caller;
      identifying projections based on the highly fragmented non-speech metadata and leaf nodes in which a history appears as a result of applying the tree growing algorithm to yield identified projections; and
      estimating a conditional, metadata dependent language model based on the identified projections and speech data from the caller.

18. The method of claim 17, wherein identifying projections further comprises using divisive likelihood-based techniques to identify non-speech metadata projections.

19. A system for automatic speech recognition, the system comprising:
   a processor; and
   a first module configured to control the processor to recognize received speech using a language model generated by steps comprising:
      applying a tree growing algorithm to highly fragmented non-speech metadata associated with a caller to a spoken dialog system, wherein the highly fragmented non-speech metadata does not describe physical characteristics of the caller;
      identifying projections based on the highly fragmented non-speech metadata and leaf nodes in which a history appears as a result of applying the tree growing algorithm to yield identified projections; and
      estimating a conditional, metadata dependent language model based on the identified projections and speech data from the caller.

20. The system of claim 19, wherein the conditional, metadata dependent language model is estimated by merging non-speech metadata conditional counts that are weighted based on a given non-speech metadata value.

* * * * *